United States Patent
Lu et al.

(10) Patent No.: US 12,180,626 B2
(45) Date of Patent: Dec. 31, 2024

(54) SEAMLESS ELASTIC STRAP WITH FORKED STRUCTURES AND MANUFACTURING METHOD THEREOF

(71) Applicant: ELASTIQUE SEAMLESS PTE. LTD., Singapore (SG)

(72) Inventors: Yang Lu, Zhongshan (CN); Shilian Li, Zhongshan (CN)

(73) Assignee: ELASTIQUE SEAMLESS PTE. LTD., Zhongshan (CN)

( * ) Notice: Subject to any disclaimer, the term of this patent is extended or adjusted under 35 U.S.C. 154(b) by 35 days.

(21) Appl. No.: 18/324,019

(22) Filed: May 25, 2023

(65) Prior Publication Data
US 2024/0360603 A1 Oct. 31, 2024

(30) Foreign Application Priority Data
Apr. 28, 2023 (CN) .......................... 202310485414.7

(51) Int. Cl.
*D04B 21/18* (2006.01)
*B29C 65/00* (2006.01)
(Continued)

(52) U.S. Cl.
CPC .............. *D04B 21/18* (2013.01); *B29C 65/08* (2013.01); *B29C 65/4815* (2013.01); *B29C 66/05* (2013.01); *B32B 5/024* (2013.01); *B32B 5/073* (2021.05); *B32B 5/263* (2021.05); *B32B 7/05* (2019.01); *D03D 15/56* (2021.01); *D04B 23/06* (2013.01); *B32B 2250/02* (2013.01); *B32B 2262/0261* (2013.01); *B32B 2307/51* (2013.01);
(Continued)

(58) Field of Classification Search
CPC ........ D04B 21/18; D04B 21/06; D04B 21/08; D04B 21/14; D04B 23/06; D04B 23/16; D04B 23/18; B32B 5/026; B32B 5/279
See application file for complete search history.

(56) References Cited

U.S. PATENT DOCUMENTS 4,878,148 A * 10/1989 Hee .......................... H05F 3/02
    66/193
5,807,295 A * 9/1998 Hutcheon .............. D04B 21/14
    602/8

(Continued)

FOREIGN PATENT DOCUMENTS

| CN | 112493602 A | * | 3/2021 | ............. A41D 27/24 |
| CN | 214207356 U | * | 9/2021 | ............. A41D 27/24 |

*Primary Examiner* — Danny Worrell

(57) ABSTRACT

A seamless elastic strap with forked structures and a manufacturing method thereof are provided, the elastic strap includes an upper layer fabric strap formed by interweaving an upper layer warp, an upper layer wrapped warp, and an upper layer weft and a lower layer fabric strap formed by interweaving a lower layer warp, a lower layer wrapped warp, and a lower layer weft. By changing the interweaving position of the upper and lower wrapped warps with the upper and lower wefts, a structure consisting of several forking parts and merging parts arranged at intervals on one elastic strap is achieved. It uses the staggered hot-cutting method to make the ends of both ends of the upper and lower fabric straps misaligned. It uses the ultrasonic welding method to form a loop fabric strap. It has the advantage of using adhesive pressing or ultrasonic welding to make seamless marks.

5 Claims, 2 Drawing Sheets

(51) Int. Cl.
  *B29C 65/08* (2006.01)
  *B29C 65/48* (2006.01)
  *B32B 5/02* (2006.01)
  *B32B 5/06* (2006.01)
  *B32B 5/26* (2006.01)
  *B32B 7/05* (2019.01)
  *D03D 15/56* (2021.01)
  *D04B 23/06* (2006.01)

(52) U.S. Cl.
  CPC ...... *D10B 2331/02* (2013.01); *D10B 2331/04* (2013.01)

(56) References Cited

U.S. PATENT DOCUMENTS

| | | | | |
|---|---|---|---|---|
| 6,105,401 A | * | 8/2000 | Chadeyron | D04B 1/22 66/196 |
| 7,380,420 B1 | * | 6/2008 | Liu | D04B 21/18 66/196 |
| 7,380,421 B1 | * | 6/2008 | Liu | D04B 21/14 66/196 |
| 7,387,001 B2 | * | 6/2008 | Wakata | D04B 21/16 66/193 |
| 7,565,821 B2 | * | 7/2009 | Park | B60N 2/976 66/195 |
| 7,610,777 B1 | * | 11/2009 | Hung | D04B 21/14 66/193 |
| 7,913,520 B1 | * | 3/2011 | Chen | D04B 1/16 66/196 |
| 9,677,209 B2 | * | 6/2017 | Daube | D04B 23/02 |
| 10,428,448 B2 | * | 10/2019 | Lawrence | D02G 3/38 |
| 11,066,764 B2 | * | 7/2021 | Alletto, Jr. | D04B 1/123 |
| 11,434,588 B2 | * | 9/2022 | Mueller | D04B 1/22 |
| 11,639,567 B2 | * | 5/2023 | Lawrence | D04B 21/16 66/196 |
| 11,708,651 B2 | * | 7/2023 | Lee | D04B 7/04 66/169 R |
| 2016/0289872 A1 | * | 10/2016 | Kieren | D04B 21/20 |
| 2018/0073172 A1 | * | 3/2018 | Kurahashi | D04B 1/00 |
| 2020/0002855 A1 | * | 1/2020 | Aristizabal | D04B 1/22 |
| 2020/0181813 A1 | * | 6/2020 | Meir | D04B 15/362 |

* cited by examiner

SEAMLESS ELASTIC STRAP WITH FORKED STRUCTURES AND MANUFACTURING METHOD THEREOF

TECHNICAL FIELD

The present disclosure relates to an elastic strap for seamless connection and its manufacturing method, in particular to a seamless elastic strap with forked structures and a manufacturing method thereof.

BACKGROUND

The shoulder strap and the bra cup of a bra, waist circumference of underwear, and other parts need to be connected to with elastic straps and fabric, and there are generally two methods in existing technology. One is to use sewing to connect, the sewing is firm and reliable, but there are obvious seam marks in the sewing area, which will reduce the comfort of wearing if the seam marks are attached to the skin. Another method is to use adhesive pressing or ultrasonic welding, this method has seamless seams and can improve wearing comfort, however, due to the alignment of the connection parts between the inner and outer layers, the connection is prone to cracking and has low reliability.

SUMMARY

In order to overcome the defects of the existing technology, the present disclosure provides an elastic strap with forked structures and a manufacturing method thereof.

The technical solution adopted by the present disclosure to solve its technical problems is:

An elastic strap with forked structures, including an upper layer fabric strap and a lower layer fabric strap, wherein the upper layer fabric strap is formed by interweaving an upper layer warp, an upper layer wrapped warp, and an upper layer weft; the lower layer fabric strap is formed by interweaving a lower layer warp, a lower layer wrapped warp, and a lower layer weft; when the upper layer wrapped warp is only interwoven with the upper layer weft, and the lower layer wrapped warp is only interwoven with the lower layer weft, it is a forking part of the elastic strap; when the upper layer wrapped warp and the lower layer wrapped warp are simultaneously interwoven with the upper layer weft and the lower layer weft, it is a merging part of the elastic strap; and the elastic strap is composed of a plurality of the forking parts and a plurality of the merging parts arranged at intervals.

At least two of the upper layer warps are arranged between adjacent two of the upper layer wrapped warps; at least two of the lower layer warps are arranged between adjacent two of the lower layer wrapped warps.

The lower layer weft and the upper layer weft are composite weft lines composed of nylon wire and hot melt wire.

The hot melt wire is one of high-temperature polyester materials or low-temperature polyamide materials.

A manufacturing method for the elastic strap, which includes the following steps:

a weaving step of the forking part: the upper layer fabric strap and the lower layer fabric strap are two independent straps, interweaving the upper layer warp and the upper layer wrapped warp only with the upper layer weft, so as to form a single-layer weft structure of the upper layer fabric strap; interweaving the lower layer warp and the lower layer wrapped warp only with the lower layer weft, so as to form a single-layer weft structure of the lower layer fabric strap;

a weaving step of the merging part: the upper layer fabric strap and the lower layer fabric strap belong to the same strap; weaving actions of the upper layer warp, the upper layer weft, the lower layer warp, the lower layer weft remain unchanged, interweaving the upper layer warp only with the upper layer weft, interweaving the lower layer warp only with the lower layer weft, and simultaneously interweaving the upper layer wrapped warp and the lower layer wrapped warp with the upper layer weft and the lower layer weft, so as to form the merging part with a double-layer weft structure;

alternating and cycling the weaving step of the forking part and the weaving step of the merging part, so as to form a long elastic straps composed of the plurality of forking parts and the plurality of merging parts arranged at intervals;

The advantageous effect of the disclosure is that by changing the interweaving position of the upper wrapped warp and the lower wrapped warp with the upper weft and the lower weft, such that a structure consisting of several forking parts and merging parts arranged at intervals on one elastic strap is achieved. When in use, it uses the staggered hot-cutting method to make the ends of both ends of the upper fabric strap and the lower fabric strap misaligned. It uses the ultrasonic welding method to form a loop fabric strap. At the same time, a reinforcing sheet is added for hot pressing to make it into one layer. It has the advantage of using adhesive pressing or ultrasonic welding to make seamless marks. There is no elasticity or micro elasticity in the welding pressing position, so it is not break at the welding and pressing area, and has the strong reliability of sewing connection, which can be widely used in bras, underwear, orthopedic clothing, etc.

BRIEF DESCRIPTION OF THE DRAWINGS

The present disclosure will be further illustrated in conjunction with the accompanying drawings and embodiments.

DETAILED DESCRIPTION OF THE EMBODIMENTS

Figure 1:
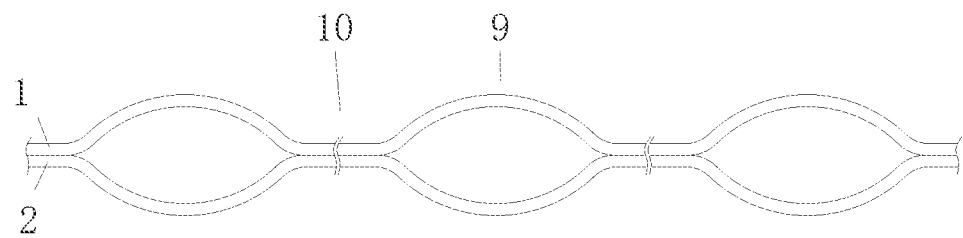
FIG. 1 is a schematic diagram of the structure of the present disclosure.
Figure 2:
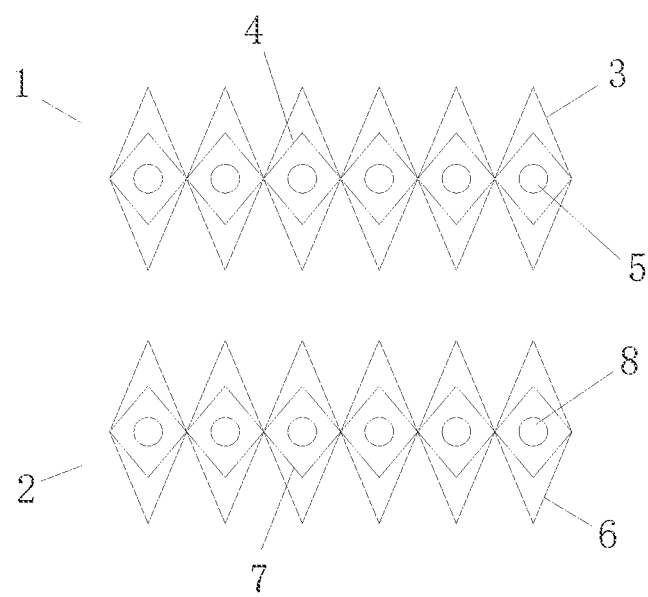
FIG. 2 is the organization chart of the forking part.
Figure 3:
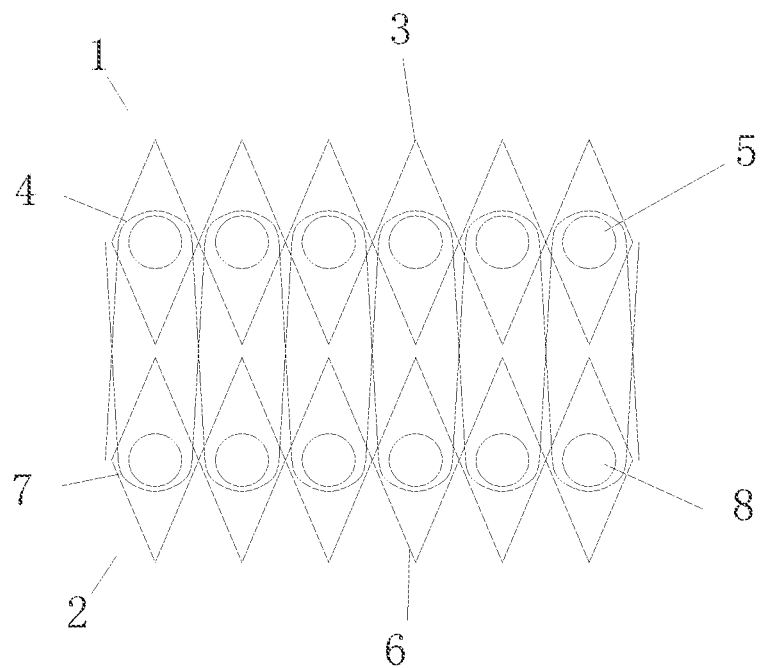
FIG. 3 is the organization chart of the merging part.

In order to make the objective, the technical solution, and the advantages of the present disclosure clearer, the following is a further detailed illustration of the present disclosure in conjunction with specific embodiments and with reference to the accompanying drawings. It should be noted that, without conflict, the embodiments of the present disclosure and the features in the embodiments can be combined with each other.

It should be understood that these descriptions are only illustrative and not intended to limit the scope of the present disclosure.

The following describes some embodiments of the present disclosure in conjunction with the accompanying drawings.

Referring to FIGS. 1 to 4, a seamless elastic strap with forked structures is provided, which includes an upper layer fabric strap 1 and a lower layer fabric strap 2, wherein the upper layer fabric strap 1 is formed by interweaving an upper layer warp 3, an upper layer wrapped warp 4, and an upper layer weft 5; the lower layer fabric strap 2 is formed by interweaving a lower layer warp 6, a lower layer wrapped warp 7, and a lower layer weft 8; when the upper layer wrapped warp 4 is only interwoven with the upper layer weft 5, and the lower layer wrapped warp 7 is only interwoven with the lower layer weft 8, it is a forking part 9 of the elastic strap; when the upper layer wrapped warp 4 and the lower layer wrapped warp 7 are simultaneously interwoven with the upper layer weft 5 and the lower layer weft 8, it is a merging part 10 of the elastic strap; and the elastic strap is composed of a plurality of the forking parts 9 and a plurality of the merging parts 10 arranged at intervals.

When weaving the forking part 9, the upper layer wrapped warp 4 and the upper layer warp 3 have the same function, both of which are used to interweave with the upper layer weft 5 to form the upper layer fabric strap 1. Similarly, the lower layer wrapped warp 7 and the lower layer warp 6 have the same function, both of which are used to interweave with the lower layer weft 8 to form the lower layer fabric strap 2. When weaving the merging part 10, the actions of the upper layer warp 3, the upper layer weft 5, the lower layer warp 6, and the lower layer weft 8 remain unchanged, only the actions of the upper layer wrapped warp 4 and the lower layer wrapped warp 7 change. The upper layer wrapped warp 4 changes from the action of only weaving with the upper layer weft 5 to the action of weaving with the upper layer wrapped warp 4 and the upper layer weft 5 and the lower layer weft 8 at the same time, changing from a single-layer weft structure to a double-layer weft structure. Similarly, the action of only interweaving the lower layer wrapped warp 7 with the upper layer weft 5 has been changed to the action of simultaneously interweaving the lower layer wrapped warp 7 with the upper layer weft 5 and the lower layer weft 8, such that the structure has been changed from a single-layer weft structure to a double-layer weft structure (as shown in the transform between FIG. 2 and FIG. 3).

In conventional knitting equipment processing, several warp knitting needles are inserted up and down, and one weft knitting needle is inserted horizontally to interweave the warp and weft threads into a knitted fabric. Based on this, the present disclosure adds one more weft knitting needle, which includes an upper weft knitting needle and a lower weft knitting needle after one more weft knitting needle is added. The warp knitting needle is divided into four parts, with one part being the upper weft knitting needle of the upper layer weft 5, one part is the lower layer warp knitting needle of the lower layer warp 6, the other part is the upper layer wrapped warp knitting needle of the upper layer wrapped warp 4, and the last part is the lower layer wrapped warp knitting needle of the lower layer wrapped warp 7. When weaving the forking part 9, the upper layer warp knitting needle and the upper layer wrapped warp knitting needle interweave with the upper layer weft knitting needle to form the upper layer fabric strap 1, and the lower layer warp knitting needle and the lower layer wrapped warp knitting needle interweaves with the lower layer weft knitting needle to form the lower layer fabric strap 2. At the weaving merging part 10, the processing actions of the upper layer weft knitting needle, the lower layer weft knitting needle, the upper layer warp knitting needle, and the lower layer warp knitting needle remain unchanged. The range of insertion of the upper layer wrapped warp knitting needle and the lower layer wrapped warp knitting needle is increased, so that the upper layer weft 5 and lower layer weft 8 can be interwoven simultaneously during knitting, which means that the interwoven upper layer weft 5 and lower layer weft 8 can be regarded as the same weft, and the total amount of the weft is the sum of the upper layer weft 5 and the lower layer weft 8.

At least two upper layer warps 3 are arranged between the adjacent two upper layer wrapped warps 4, and at least two lower layer warps 6 are arranged between the adjacent two lower layer wrapped warps 7. When weaving the forking part 9, the upper layer warp 3 has the same effect as the upper layer wrapped warp 4, and the lower layer warp 6 has the same effect as the lower layer wrapped warp 7, only increasing the warp content of the upper layer fabric strap 1 and the lower layer fabric strap 2. When weaving the merging part 10, the upper layer wrapped warp 4 and the lower layer wrapped warp 7 are respectively interwoven with the upper layer weft 5 and the lower layer weft 8 at the same time, such that the upper layer fabric strap 1 and the lower layer fabric strap 2 are woven into the same fabric strap. In production, it is required to ensure the content of the upper layer wrapped warp 4 and the lower layer wrapped warp 7. After a series of tests, such as multiple stretching, the merging part 10 does not appear to delaminate.

The lower layer weft 8 and the upper layer weft 5 are composite weft lines composed of nylon wire and hot melt wire. When cutting the elastic strap, a hot cutting process is used to melt and seal the hot melt wire in the composite weft, avoiding the occurrence of scattered seams at the incision.

The hot melt wire is one of high-temperature polyester materials or low-temperature polyamide materials. The present disclosure adopts low-temperature polyamide materials, and the proportion content of the hot melt wire is selected according to different production requirements.

A manufacturing method for the seamless elastic strap as described above, which is as follows:

The weaving step of the forking part: the upper layer fabric strap 1 and the lower layer fabric strap 2 are two independent straps, interweaving the upper layer warp 3 and the upper layer wrapped warp 4 only with the upper layer weft 5, so as to form a single-layer weft structure of the upper layer fabric strap 1; interweaving the lower layer warp 6 and the lower layer wrapped warp 7 only with the lower layer weft 8, so as to form a single-layer weft structure of the lower layer fabric strap 2.

The weaving step of the merging part: the upper layer fabric strap 1 and the lower layer fabric strap 2 belong to the same strap; weaving actions of the upper layer warp 3, the upper layer weft 5, the lower layer warp 6, the lower layer weft 8 remain unchanged, interweaving the upper layer warp 3 only with the upper layer weft 5, interweaving the lower layer warp 6 only with the lower layer weft 8, and simultaneously interweaving the upper layer wrapped warp 4 and the lower layer wrapped warp 7 with the upper layer weft 5 and the lower layer weft 8, so as to form the merging part 10 with a double-layer weft structure.

Alternating and cycling the weaving step of the forking part and the weaving step of the merging part, so as to form a long elastic straps composed of the plurality of the forking parts and the plurality of the merging parts arranged at intervals.

The application step are as follows:

The step of staggered hot-cutting segmentation: applying ultrasonic staggered hot-cutting on adjacent two of the forking parts 9 to form a fabric strap with a middle part being the merging part 10 and the two ends forked; a length of the upper layer fabric strap at one end is longer than that of the lower layer fabric strap, and a length of the lower layer fabric strap at an other end is longer than that of the upper layer fabric strap. It should be noted that the upper and lower are relative, and the inside and outside are also relative. For the convenience of explanation, the concept of upper and lower, inside and outside, has been adopted in this embodiment, which can be understood by the skilled person in the art.

Welding step: conducting ultrasonic welding (ultrasonic welding is the same as the existing technology, without special requirements) at the head and tail of the fabric strap after staggered hot-cutting segmentation to form a loop-shaped belt, and an upper connecting part 11 and a lower connecting part 12 are naturally formed at a welding position (the end face is close to or has a small amount of overlap during welding).

Hot pressing reinforcement: inserting a reinforcement sheet 13 coated with hot-melt adhesive on both sides (the reinforcement sheet 13 may be a mesh structure yarn with PA, TPU, PUR, or a mixture of hot-melt adhesive, and the reinforcement sheet 13 has no elastic or micro elastic material) between the upper connecting part 11 and the lower connecting part 12, and then conducting hot pressing (hot pressing is the same as the existing technology, without special requirements, and the coating may be local spot coating or whole surface coating) to connect the upper connecting part 11 and the lower connecting part 12 into one layer. There is no elasticity or micro elasticity in the welding pressing position, so it will not break at the welding and pressing area.

Figure 4:
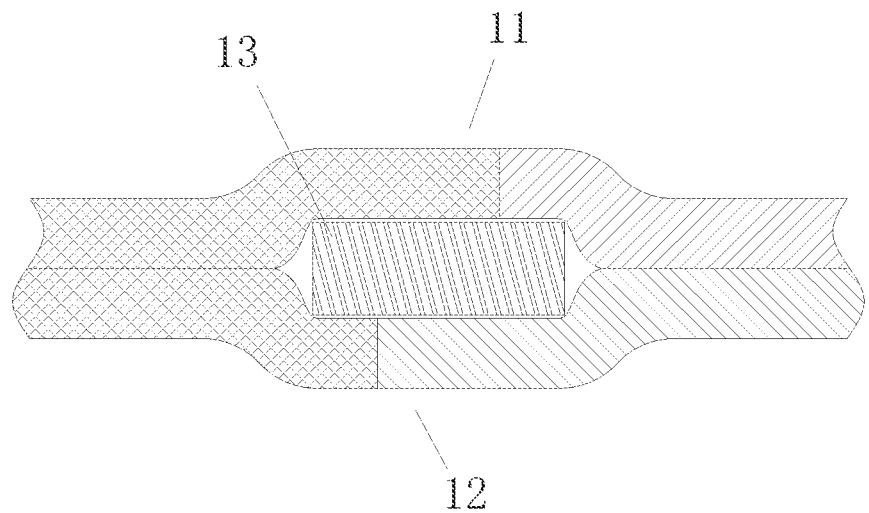
FIG. 4 is a schematic diagram of the position relationship between the upper layer connecting part, the lower layer connecting part, and the reinforcing sheet.

In the present disclosure, by changing the interweaving position of the upper wrapped warp and the lower wrapped warp with the upper weft and the lower weft, a structure consisting of several forking parts and merging parts arranged at intervals on one elastic strap is achieved. When in use, it uses the staggered hot-cutting method to make the ends of both ends of the upper fabric strap and the lower fabric strap misaligned, using the ultrasonic welding method to form a loop fabric strap. That is, in the forked structure, the two ends of the upper layer fabric strap are welded together to form the upper connecting part 11, and the two ends of the lower layer fabric strap are welded together to form the lower layer connecting part 12. At this time, the upper connecting part 11 and the lower layer connecting part 12 belong to a misalignment relationship (as shown in FIG. 4). At the same time, the reinforcing sheet 13 is added between the upper connecting part 11 and the lower connecting part 12 for hot pressing to make the upper connecting part 11 and the lower connecting part 12 into one layer. It has the advantage of using adhesive pressing or ultrasonic welding to make seamless marks. There is no elasticity or micro elasticity in the welding pressing position, so it is not break at the welding and pressing area, and has the strong reliability of sewing connection, which can be widely used in bras, underwear, orthopedic clothing, etc.

In the present disclosure, the term "a plurality of" refers to two or more, unless otherwise specified. The term "and/or" used in this article includes any and all combinations of one or more related listed items. The terms "installation", "connection", "connected", "fixation" and other terms should be understood in a broad sense. For example, "connection" can be a fixed connection, a detachable connection, or an integrated connection; "connected" can be directly connected or indirectly connected through intermediate media. For ordinary skilled person in the art, the specific meanings of the above terms in the present disclosure can be understood based on specific circumstances.

It should be noted that when a component is referred to as "assembled on", "installed on", "fixed on" or "provided on" another component, it can be directly on another component or there can be a middle component between the two. When a component is considered to be "connected" to another component, it can be directly or indirectly connected to another component. The terms "vertical", "horizontal", "up", "down", "left", "right", and similar expressions used in this article are for illustrative purposes only and do not necessarily represent the only implementation method.

In the description of this specification, the terms "one embodiment", "some embodiments", "specific embodiments", etc. refer to the specific features, structures, materials, or features described in conjunction with the embodiment or example being included in at least one embodiment or example of the present disclosure. In this specification, the schematic expressions of the above terms do not necessarily refer to the same embodiments or examples. Moreover, the specific features, structures, materials, or features described can be combined in an appropriate manner in any one or more embodiments or examples.

Although embodiments of the present disclosure have been shown and described, ordinary skilled person in the art can understand that various changes, modifications, substitutions, and variations can be made to these embodiments without departing from the principles and purposes of the present disclosure. The scope of the present disclosure is limited by the claims and their equivalents.

What is claimed is:

1. A seamless elastic strap with forked structures, comprising an upper layer fabric strap (1) and a lower layer fabric strap (2), wherein the upper layer fabric strap (1) is formed by interlacing an upper layer warp (3), an upper layer wrapped warp (4), and an upper layer weft (5); the lower layer fabric strap (2) is formed by interlacing a lower layer warp (6), a lower layer wrapped warp (7), and a lower layer weft (8); when the upper layer wrapped warp (4) is only interwoven with the upper layer weft (5), and the lower layer wrapped warp (7) is only interwoven with the lower layer weft (8), it is a forking part (9) of the elastic strap; when the upper layer wrapped warp (4) and the lower layer wrapped warp (7) are simultaneously interwoven with the upper layer weft (5) and the lower layer weft (8), it is a merging part (10) of the elastic strap; and the elastic strap is composed of a plurality of the forking parts (9) and a plurality of the merging parts (10) arranged at intervals.

2. The seamless elastic strap according to claim 1, wherein at least two of the upper layer warps (3) are arranged between adjacent two of the upper layer wrapped warps (4); at least two of the lower layer warps (6) are arranged between adjacent two of the lower layer wrapped warps (7).

3. The seamless elastic strap according to claim 1, wherein the lower layer weft (8) and the upper layer weft (5) are composite weft lines composed of nylon wire and hot melt wire.

4. The seamless elastic strap according to claim 3, wherein the hot melt wire is one of high-temperature polyester materials or low-temperature polyamide materials.

5. A manufacturing method for the seamless elastic strap according to claim 1, comprising:
a knitting step of forking part: the upper layer fabric strap (1) and the lower layer fabric strap (2) are two independent straps, interlacing the upper layer warp (3) and the upper layer wrapped warp (4) only with the upper layer weft (5), so as to form a single-layer weft structure of the upper layer fabric strap (1); interlacing the lower layer warp (6) and the lower layer wrapped warp (7) only with the lower layer weft (8), so as to form a single-layer weft structure of the lower layer fabric strap (2);

a knitting step of the merging part: the upper layer fabric strap (1) and the lower layer fabric strap (2) belong to the same strap; knitting actions of the upper layer warp (3), the upper layer weft (5), the lower layer warp (6), the lower layer weft (8) remain unchanged, interlacing the upper layer warp (3) only with the upper layer weft (5), interlacing the lower layer warp (6) only with the lower layer weft (8), and simultaneously interlacing the upper layer wrapped warp (4) and the lower layer wrapped warp (7) with the upper layer weft (5) and the lower layer weft (8), so as to form the merging part (10) with a double-layer weft structure;

alternating and cycling the knitting step of the forking part and the knitting step of the merging part, so as to form a long elastic straps composed of the plurality of the forking parts (9) and the plurality of the merging parts (10) arranged at intervals;

an application step are as follows:

a step of staggered hot-cutting segmentation: applying ultrasonic staggered hot-cutting on adjacent two of the forking parts (9) to form a fabric strap with a middle part being the merging part (10) and the two ends forked; a length of the upper layer fabric strap at one end is longer than that of the lower layer fabric strap, and a length of the lower layer fabric strap at an other end is longer than that of the upper layer fabric strap;

welding step: conducting ultrasonic welding at the head and tail of the fabric strap after staggered hot-cutting segmentation to form a loop-shaped belt, and an upper connecting part (11) and a lower connecting part (12) are naturally formed at a welding position;

hot pressing reinforcement: inserting a reinforcement sheet (13) coated with hot-melt adhesive on both sides between the upper connecting part (11) and the lower connecting part (12), and then conducting hot pressing to connect the upper connecting part (11) and the lower connecting part (12) into one layer.

\* \* \* \* \*